Dec. 13, 1955 J. K. BRIXIUS 2,726,731
RIGID CHARGING ELECTRODE FOR ELECTROSTATIC FILTER
Filed Aug. 29, 1951
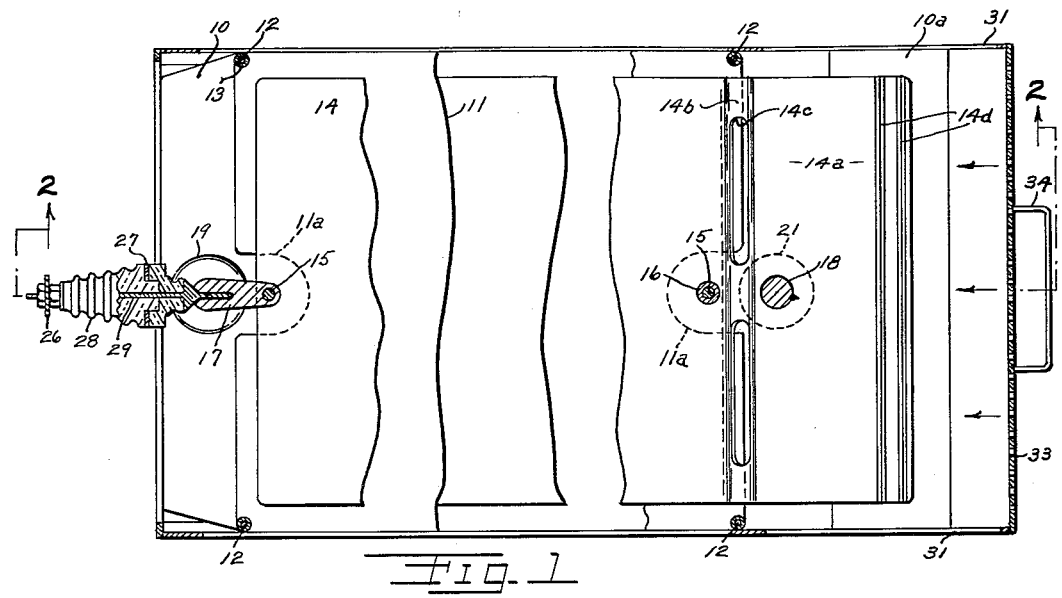
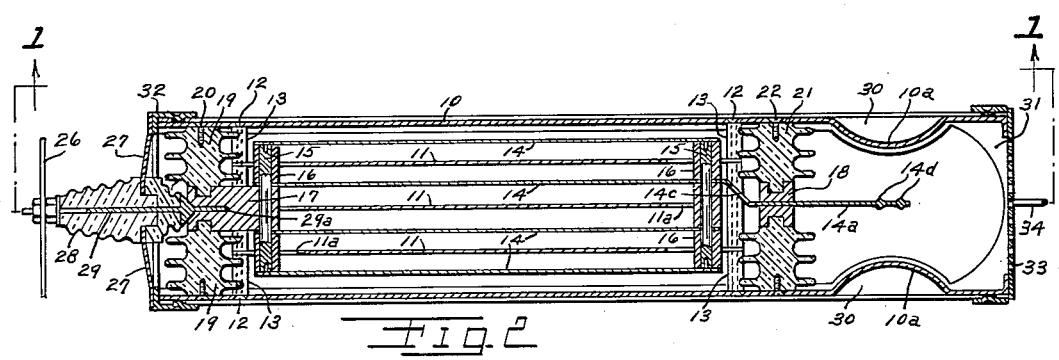
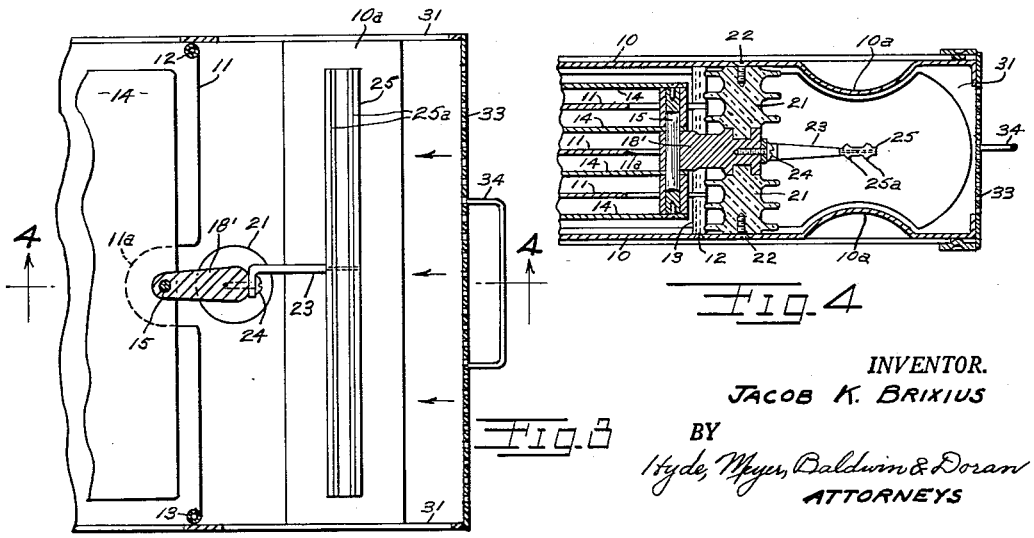
INVENTOR.
JACOB K. BRIXIUS
BY
Hyde, Meyer, Baldwin & Doran
ATTORNEYS

United States Patent Office 2,726,731
Patented Dec. 13, 1955

2,726,731

RIGID CHARGING ELECTRODE FOR ELECTROSTATIC FILTER

Jacob K. Brixius, Cleveland, Ohio, assignor to Air-Maze Corporation, Cleveland, Ohio, a corporation of Delaware Application August 29, 1951, Serial No. 244,139

2 Claims. (Cl. 183—7)

This invention relates to improvements in charging electrodes for electrostatic filters, and more particularly to a rigid electrode adapted to rough usage.

One of the objects of the present invention is to improve an electrostatic filter cell having collector plates charged with electricity of opposite sign and having upstream therefrom one or more charging electrodes, the improvement consisting of one or more rigid charging electrodes having sharp projections concentrating the charging effect in much the same manner as a fine wire electrode, but the rigid electrode being adapted to withstand much rougher usage than a fine wire electrode.

Another object of the present invention is to support a rigid electrode of the character mentioned in the preceding paragraph in a novel manner as to function as described.

Other objects and advantages of my invention will be apparent from the accompanying drawings and description and the essential features thereof will be set forth in the appended claims.

In the drawings,

Fig. 1 is a central sectional view taken along the line 1—1 of Fig. 2 showing a filter cell embodying my invention;

Fig. 2 is a transverse sectional view of the same taken along the line 2—2 of Fig. 1;

Fig. 3 is a fragmental sectional view similar to the right-hand end of Fig. 1 and showing a modification; while Fig. 4 is a fragmental sectional view taken along the line 4—4 of Fig. 3.

While this invention might be incorporated in a number of electrostatic filter cells, I have chosen to show the same as embodied in a cell of the type described and claimed in the copending application of Christian W. Savitz, Serial No. 64,642, filed December 10, 1948, now Patent No. 2,639,781, granted May 26, 1953, for an "Electrostatic Filter," to which reference may be had for details omitted here.

The electrostatic cell shown in Figs. 1 and 2 is like that shown and described in the above mentioned copending application of Savitz in that it provides a set of grounded collector plates comprising a pair of outside plates 10 and a set of inside plates 11. These plates are held together by four bolts 12 which extend through cylindrical spacers 13. The side plates 10 have upstream portions 10a bent inwardly to provide grounded electrodes opposite the fine wire charging electrodes as will presently appear. Another set of charged collector plates 14 are positioned alternately between and parallel to the grounded plates 10 and 11. The electrode 10a projects inwardly beyond the outermost collector plate 14. The plates 14 are shorter and narrower than the plates 11 as clearly shown in Fig. 1. The plates 14 are electrically connected and supported along their horizontal center line by means of bolts 15. Spacers 16 hold the plates 14 in proper position. Each bolt 15 is supported by an insulated bracket 17 at the rear end and 18 at the front end. The bracket 17 is supported by insulators 19 which are rigidly secured to the plates 10 by the screws 20. The bracket 18 is rigidly supported by the insulators 21 which in turn are rigidly secured to the side plates 10 by means of screws 22. The plates 11 are cut away as indicated at 11a so as to give a proper air gap between these grounded plates and the charged bolts 15 and spacers 16.

In the modification of Figs. 1 and 2, the charging electrode is provided by extending one of the plates 14 forwardly or upstream as shown at 14a until it lies between the grounded electrodes 10a. A portion of the incoming air stream entering the filter cell strikes the projecting electrode 10a and is deflected against the plate extension 14a which causes the air current to flow in a direction generally parallel to the plates. The bracket 18 passes through and is rigidly secured to plate extension 14a (as by the welding shown in Fig. 2). Thus bracket 18 supports plates 14 at the upstream end. The bent portion 14b of the extension may be cut away as at 14c to facilitate flow of the gaseous stream to be filtered. At its upstream end, plate extension 14a is provided with one or more projecting ribs 14d on opposite sides of the plate and facing grounded electrodes 10a. Each rib extends the full width of plate 14 and its extension 14a and the ribs have sharp edges facing the associated electrode 10a so as to concentrate the electrical discharge from the rib across the gaseous stream. Preferably two parallel ribs 14d are provided on each side of extension 14a spaced as taught in the above mentioned Savitz application and for the purpose there described.

The means for supporting the charging electrode in the modification of Figs. 3 and 4 will now be described. Here the bracket 18' directly supports bolt 15 and plates 14. A bracket 23 of electrically conducting material is rigidly mounted on the electrically conducting bracket 18' by means of a screw 24 with the axis of the bracket extending upstream substantially parallel to the general direction of air flow through the cell as indicated by the arrows in Fig. 3. On the upstream end of the bracket a bar 25 of electrically conducting material is rigidly mounted generally at right angles to the direction of stream flow and parallel to the upstream edges of plates 11 and 14. One or more projecting ribs 25a are provided on opposite sides of bar 25 facing grounded electrodes 10a. Each rib extends the full length of bar 25 and has a sharp edge facing the associated electrode 10a so as to concentrate the electrical discharge from the rib across the gaseous stream. Preferably two parallel ribs 25a are provided on each side of bar 25 spaced as taught in the above-mentioned Savitz application and for the purpose there described. The rest of the structure of Figs. 3 and 4 is like Figs. 1 and 2.

The manner of charging the cell in both modifications will now be described. As clearly described in the above-mentioned copending application of Savitz, a suitable power pack provides high voltage substantially unidirectional current to the cell. One side of the rectified circuit is connected to bus bar 26 and the other side is grounded, as are plates 10 and 11. This supply as described in said Savitz application gives a half-wave rectification but the plates 10 and 11 and 14 give such a voltage-smoothing effect that a slightly pulsating generally unidirectional current results.

Rigidly supported from the cell frame by brackets 27, is an insulator 28. Passing axially of this insulator is a conductor 29 electrically connected at one end with the bus bar 26 and terminating inwardly in a conducting prong 29a. The cell is slidable horizontally in a frame comprised of the side members 30, top and bottom plates 31, and frame members 32 at the downstream end. A perforated plate 33 connects side plates 10 at their upstream end and handle 34 is attached rigidly to plate 33 for manipulating of the cell. As the cell slides into the position shown in Figs. 1 and 2, the electrically conducting bracket 17 has a recess which receives tightly the prong 29a so that the high voltage unidirectional current is transmitted from the bus bar 26 through conductor 29, bracket 17 and bolts 15 and spacers 16 to the plates 14. In the form of my invention in Figs. 1 and 2, the charge of plates 14 becomes the charge on the extension 14a and on the ribs 14d thereof. In the form shown in Figs. 3 and 4, at the forward end of the plates 14 they are electrically connected to the member 18 which in turn conducts electricity to the member 23 and thus to the bar 25 and the ribs 25a thereof.

What I claim is:

1. In an electrostatic filter for a gas stream having laterally spaced parallel collector plates, said collector plates comprising a grounded set and a charged set alternately positioned across the filter parallel to the general direction of stream flow, one of said plates of said charged set having an extension upstream beyond the rest of said plates, said extension being a plate of substantially the same width as the collector plate from which it extends, said extension being generally parallel to said collector plates, the upstream portion of said extended plate having elongated projecting ribs on opposite side faces of said plate, said ribs having sharp edges directed laterally away from said plate whereby electrical discharge from said ribs will be across said stream for charging particles carried thereby, a coacting electrode opposite each of said ribs, and means for supplying high voltage substantially uni-directional electric current of opposite sign respectively to said ribs and said electrodes.

2. In an electrostatic filter for a gas stream having laterally spaced parallel collector plates, said collector plates comprising a grounded set and a charged set alternately positioned across the filter parallel to the general direction of stream flow, one of said plates of said charged set having an extension upstream beyond the rest of said plates, said extension being a plate of substantially the same width as the collector plate from which it extends, said extension being generally parallel to said collector plates, the upstream portion of said extended plate having elongated projecting ribs on opposite side faces of said plate, said ribs having sharp edges directed laterally away from said plate whereby electrical discharge from said ribs will be across said stream for charging particles carried thereby, a coacting electrode opposite each of said ribs, said electrodes projecting laterally inwardly beyond the laterally outermost collector plate, said extension plate being extended sufficiently toward the upstream end of said filter to be engaged by a gaseous stream entering the filter and deflected by said projecting electrode, and means for supplying high voltage substantially uni-directional electric current of opposite sign respectively to said ribs and said electrodes.

References Cited in the file of this patent

UNITED STATES PATENTS

| | | |
|---|---|---|
| 1,342,651 | Squires | June 8, 1920 |
| 1,343,285 | Schmidt | June 15, 1920 |
| 1,357,466 | Moller | Nov. 2, 1920 |
| 2,359,149 | Pegg | Sept. 26, 1944 |

FOREIGN PATENTS

| | | |
|---|---|---|
| 471,795 | Germany | Feb. 21, 1929 |
| 709,433 | France | May 18, 1931 |
| 944,547 | France | Apr. 7, 1949 |